(12) United States Patent
    Tuineag

(10) Patent No.: US 10,113,661 B2
(45) Date of Patent: Oct. 30, 2018

(54) FLOW CONTROL VALVE

(71) Applicant: Griswold Controls, LLC, Irvine, CA (US)

(72) Inventor: Stefan I. Tuineag, Irvine, CA (US)

(73) Assignee: Griswold Controls, LLC, Irvine, CA (US)

( * ) Notice: Subject to any disclaimer, the term of this patent is extended or adjusted under 35 U.S.C. 154(b) by 46 days.

(21) Appl. No.: 15/251,739

(22) Filed: Aug. 30, 2016

(65) Prior Publication Data
US 2018/0058603 A1   Mar. 1, 2018

(51) Int. Cl.
*F16K 27/04*   (2006.01)
*F16K 31/04*   (2006.01)
*F16K 3/08*    (2006.01)
*G05D 7/06*    (2006.01)

(52) U.S. Cl.
CPC .......... *F16K 27/045* (2013.01); *F16K 31/043* (2013.01); *G05D 7/0635* (2013.01); *F16K 3/085* (2013.01)

(58) Field of Classification Search
CPC ........... F16K 3/085; F16K 3/08; F16K 31/041
USPC ................. 251/129.11; 137/625.31
See application file for complete search history.

(56) References Cited

U.S. PATENT DOCUMENTS

| | | | | | |
|---|---|---|---|---|---|
| 3,780,758 | A | * | 12/1973 | DeVries | F16K 3/08 137/454.6 |
| 3,807,455 | A | * | 4/1974 | Farrell | F16K 3/08 137/454.6 |
| 4,821,765 | A | * | 4/1989 | Iqbal | F16K 3/08 137/270 |
| 4,844,116 | A | * | 7/1989 | Buehler | E03B 9/02 137/360 |
| 4,984,601 | A | * | 1/1991 | Andersson | B08B 9/00 137/486 |
| 7,753,014 | B2 | * | 7/2010 | Fitzgerald | F01L 9/02 123/90.11 |
| 8,074,966 | B2 | * | 12/2011 | Biester | E21B 34/04 251/249.5 |
| 8,973,600 | B2 | * | 3/2015 | Esveldt | F16K 1/12 137/219 |
| 2004/0144430 | A1 | * | 7/2004 | Huang | A61M 16/12 137/624.13 |
| 2004/0182457 | A1 | * | 9/2004 | Vidal | B01D 35/04 137/625.31 |
| 2007/0068583 | A1 | * | 3/2007 | Johnson | F16K 27/045 137/625.31 |
| 2016/0186867 | A1 | * | 6/2016 | Maercovich | F16K 31/041 251/129.11 |

* cited by examiner

*Primary Examiner* — Seth W Mackay-Smith
(74) *Attorney, Agent, or Firm* — Crockett & Crockett, PC; K. David Crockett, Esq.

(57) ABSTRACT

A valve in which the flow control element includes a fixed disk and a rotatable disk, and a motor operable to rotate the rotatable disk. The motor is disposed in the bore of the valve, aligned with the long axis of the valve body and the axis of rotation of the rotatable disk.

10 Claims, 3 Drawing Sheets

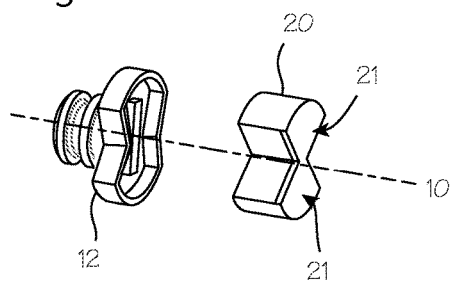
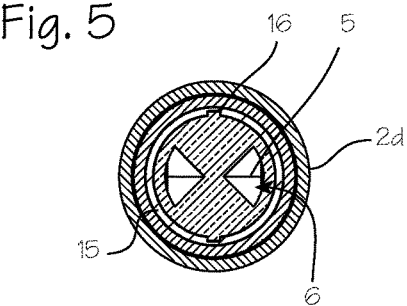
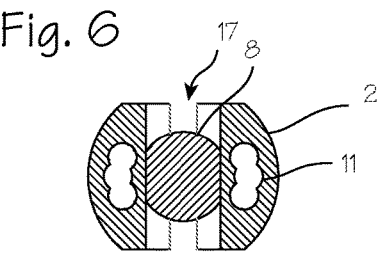
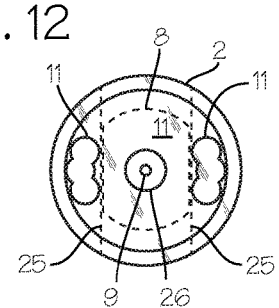
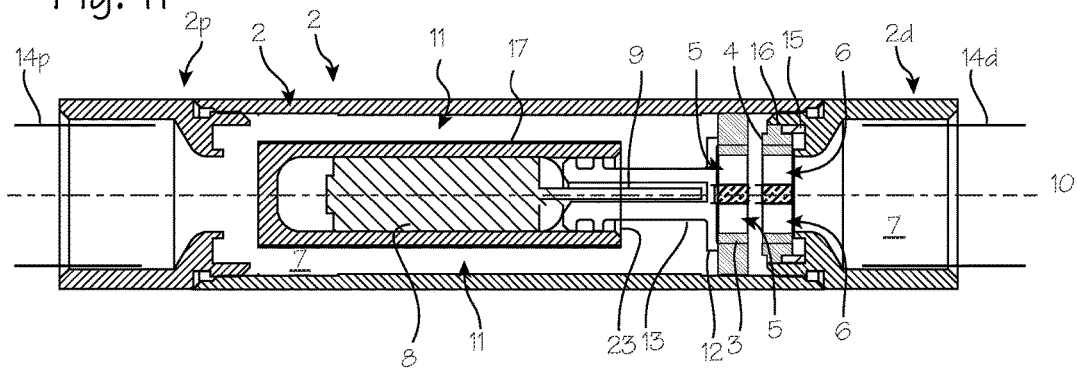

FLOW CONTROL VALVE

FIELD OF THE INVENTIONS

The inventions described below relate to the field of valves for controlling water flow in HVAC systems.

BACKGROUND OF THE INVENTIONS

U.S. patent application Ser. No. 14/457,120, filed Aug. 12, 2014 (U.S. Pub. 2015/0285384 (Oct. 8, 2015) discloses an axially aligned rotationally adjustable flow control valve with an integrally formed Venturi nozzle. The valve comprises a body characterized by a proximal end and a distal end, with an inlet section disposed at the proximal end of the body and an outlet section disposed at the distal end of the body, and a rotatable disk, rotatable relative to the valve body, rotatably disposed within the bore of the valve and a fixed disk, fixed relative the valve body, and also disposed within the bore of the valve body proximate to the rotatable disk. The disks both have apertures, and the valve is opened by rotating the rotatable disk so that apertures of the rotatable disk align with apertures of the fixed disk, and the valve is closed by rotating the disk so that the apertures of the rotation disk align with solid portions to the fixed disk. A post, secured to the rotatable disk, extends from the disk, through a circumferential slot in the valve body, so that the rotatable disk may be rotated by hand, with an operator sliding the post through the slot to rotate the rotatable disk relative to the fixed disk.

SUMMARY

The valve disclosed in this application is a motorized flow control valve, for use in controlling water flow in an HVAC system, which comprises a body with a bore extending from the inlet side of the valve to the outlet side of the valve, a rotatable disk, rotatable relative to the valve body, and a fixed disk, fixed relative the valve body. The rotating disk is rotatable from the inside of the valve body, via a motor that is encased in the valve body, in the flow path of the valve. The valve may be formed with a straight bore segment, extending from the inlet to the outlet, with the motor or output gear of a gear box driven by the motor, the rotatable disk, and the fixed disk all aligned generally coaxially with each other, and coaxially within a cylindrical bore of the valve body.

BRIEF DESCRIPTION OF THE DRAWINGS

FIG. 4 shows an alternative configuration of the rotatable disk and its carrier.

FIG. 5 is a cross section of the valve, through the region holding the fixed disk.

FIG. 6 is a cross section of the valve, through the region holding the motor and the flow path around the motor.

FIG. 11 illustrates a version of valve, in which the rotatable disk is distanced from the motor housing, and the rotatable disk openings are apertures which extend through the rotatable disk.

FIG. 12 shows an end-view of the valve of FIGS. 1 through 3, 7 and 8, or FIG. 11, to illustrate one manner in which the motor well is established and isolated from the flow of fluid past the motor.

DETAILED DESCRIPTION OF THE INVENTIONS

Figure 1:
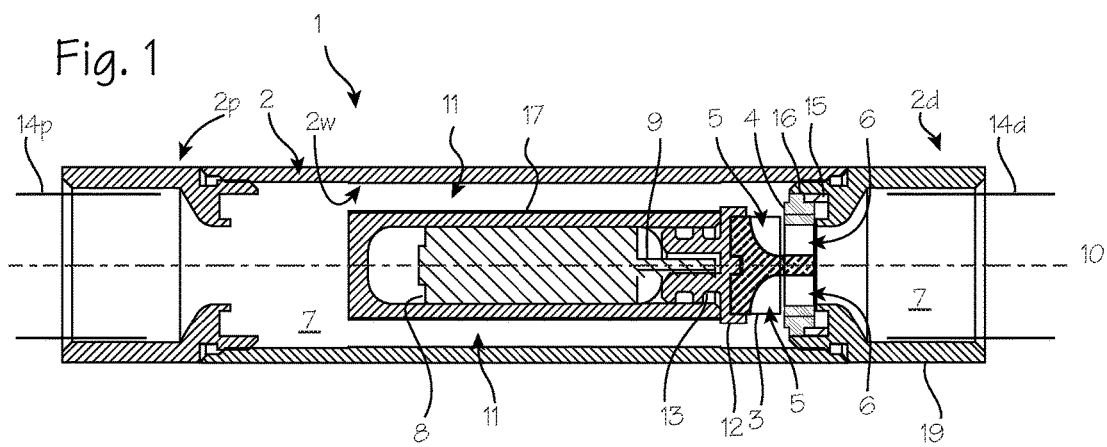
FIGS. 1 and 2 are longitudinal cross-sections of the flow control valve.
Figure 2:
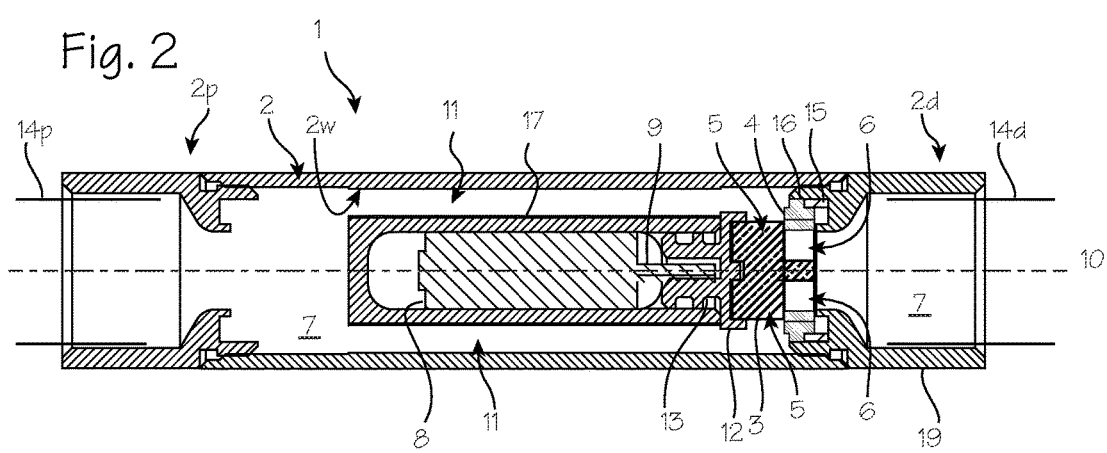

FIGS. 1 and 2 are longitudinal cross-sections of the flow control valve. The valve 1 comprises a valve body 2, characterized by a first end 2p and a second end 2d (the valve is bi-directional and flow can pass through the valve in either direction, so that either end may be serve as the inlet or the outlet, or, correspondingly, the proximal end and the distal end). Two disks 3 and 4, each with openings such as flutes 5 in the rotatable disk and apertures 6 in the fixed disk, are disposed within the bore 7 of the valve. Disk 3 is rotatable within the bore, and longitudinally fixed within the bore. Disk 4 is fixed, both longitudinally and rotationally, within the bore. In this embodiment, disk 3 serves as a rotatable valve component and disk 4 serves as a fixed valve component.

While fixed disk 4 may have outer diameter closely matching the inner diameter of the valve body 2 (or the end cap 19) in the vicinity of the fixed disk, the rotatable disk 3 has an outer diameter significantly smaller than the inner diameter of the valve body proximate the rotatable disk, thus establishing a flow path between the outer circumference of the rotatable disk and the inner wall 2w of the valve body. The openings 5 extend through some thickness of the rotatable disk and open to the circumference or side wall of the rotatable disk. Thus, flow through the valve follows the path through apertures 6 of the fixed disk, through openings 5 in the face of the rotatable disk facing the fixed disk, radially through the radially facing portion of openings 5, between the rotatable disk and the inner wall 2w of the valve body, and through channels 11 (flow may be in either direction).

A motor 8 is disposed in the bore of the valve, in the flow path established by the bore of the valve, with a motor shaft 9 parallel with the longitudinal axis 10 of the valve (as illustrated, the motor shaft axis is coincident with the longitudinal axis of the valve body (coaxial with the valve body), but it may be off-center and parallel to the longitudinal axis) and/or aligned with the rotatable disk (again, that is, the longitudinal axis of the motor may be coincident with the axis of rotation of the rotatable disk). The motor may be directly coupled through its shaft to the rotatable disk, or it may operate to rotate the rotatable disk through a sun gear/planetary gear arrangement connecting the motor shaft to the rotatable disk, or the motor may operate a ring gear connecting the motor shaft to the rotatable disk.

Flow channels 11, established between the motor 8 and the wall of the valve body 2, provide a fluid pathway around the motor and through the valve. The rotatable disk 3 is operably connected to the motor shaft, so that the motor is operable to rotate the rotatable disk relative to the valve body and the fixed disk. In this configuration, the rotatable disk 3 is indirectly fixed to the motor through carrier ring 12 and mounting post 13, which is fixed to the rotatable disk 3, and this carrier ring is likewise rotatable within the bore, and longitudinally fixed within the bore. The carrier may be formed integrally with the rotatable disk, or the motor shaft, or the rotatable disk may be directly fixed to the motor shaft. The ends of the valve may include mating structures for securing the valve to conduits 14p and 14d at either end of the valve.

Various components are included to facilitate operation or construction of the valve. A stop ring 15 may be used to secure the fixed disk in the valve bore, with locking tabs 16 on the fixed disk cooperating with locking channels in the stop ring (or vice-versa), and various seals and O-rings may be used as necessary to protect the motor from the surrounding flow path. As shown in FIGS. 1 and 2, the motor is disposed within a well or housing 17, which provides a volume within the bore of the valve isolated from the water flow around the motor. The housing may be open on a side, so that during manufacture the motor may be slipped into the housing (see the exploded view of FIG. 3), with its shaft inserted into the carrier. If the motor is sealed in its own water-tight housing, such that it may be disposed in the water stream flowing through the valve, the housing need not be provided.

In FIG. 1, the valve is shown in its open position, with the rotatable disk 3 rotated into position such that the flutes 5 are aligned with the aperture of the fixed disk 4, such that water may flow through the valve. In FIG. 2, the valve is closed, with the rotatable disk 3 rotated into position such that the flutes 5 are aligned with the solid portions of the fixed disk, and the solid portions of the rotatable disk 3 are aligned with the apertures of the fixed disk 4, such that water flow through the valve is prevented. The rotatable disk may be rotated to bring the apertures into perfect alignment to allow full flow, into perfect misalignment to prevent all flow, or into varying degrees of overlap to adjust flow over a wide range of flow rates.

Figure 3:
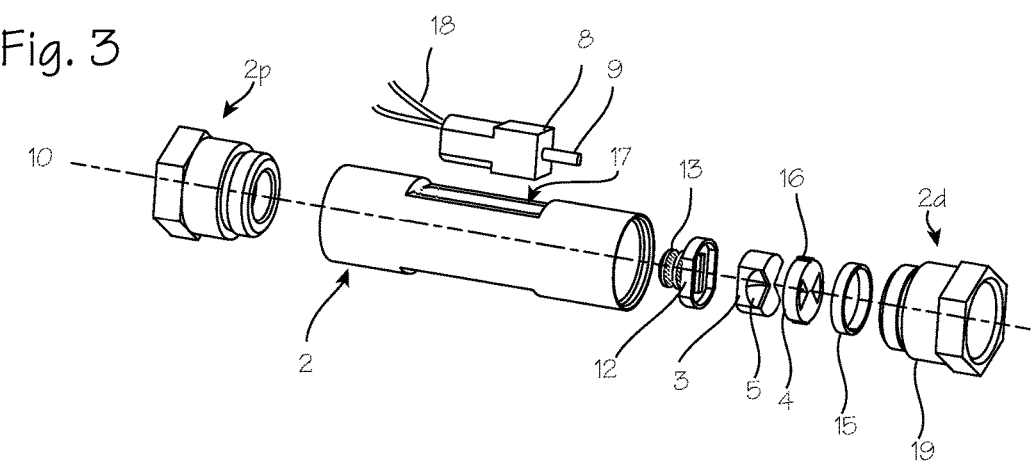
FIG. 3 is an exploded view of the valve, showing various components of the valve of FIGS. 1 and 2.

FIG. 3 is an exploded view of the valve, showing various components of the valve 1 of FIGS. 1 and 2. This view shows the outside of the valve body 2 and more clearly shows the well 17 which accommodates the motor, and the opening of the well to the outside of the valve. The motor may be powered through electrical wires 18, so that the valve may be automatically controlled by an associated system. The valve body 2 may be capped on either end with any suitable means for fixing the valve body to surrounding piping, including the end caps illustrated, or any other means such as threaded fittings or flanges, or the fixation means may be omitted if the valve is to be welded, swaged, or soldered into place in the surrounding piping. The fixed disk 4 and rotatable disk 3 are shown in relation to the stop ring 15, which fixes the fixed disk rotationally within the valve body, and the carrier 12, which fixed the rotatable disk 3 rotationally to the motor shaft 9. The valve illustrated in FIG. 3 can be made by forming the various components separately, and trapping the several components within the valve bore, in which case provision of the carrier and stop ring make assembly convenient. The stop ring may be omitted if comparable means for fixing the fixed disk is formed integrally with the end cap (or fixed end) 19, and the carrier may be omitted if the rotatable disk is fixed directed to the motor shaft. Also, the end cap 19 may serve as the fixed valve component, with apertures and occluding regions provided in the end cap.

The rotatable disk 3 is shown in perspective in FIG. 3, to more clearly illustrate the flutes 5. The apertures through this disk comprise flutes formed as cutouts in the rotatable disk, in the face that immediately abuts the fixed disk or other fixed valve component in which the corresponding fixed apertures are provided. The flutes are voids in the face of the disk and a corresponding sidewall of the disk, that extend through some thickness of the disk and open to the circumference or side wall of the rotatable disk, but do not extend through the entire thickness of the disk, leaving a plain portion of the rotatable disk in the proximal portion of the disk (the upstream portion, or the portion that is opposite the fixed disk or other component with fixed apertures and proximate the distal face of the carrier ring). This definition of the flute will help distinguish apertures that extend only partly through the thickness of the disc from apertures that extend entirely through the disk. The rotatable disk sits in a void of the carrier 12, and the void is configured to mate with the outer contour of the rotatable disk.

The fixed disk 4 is shown in perspective in FIG. 3, to more clearly illustrate the apertures 6. This disk is conveniently fabricated as a circular disk with apertures 6 formed as through-holes. For ease in assembly, the fixed disk has a generally circular outer shape, with one or more tabs 16 sized and dimensioned to fit into the corresponding slots in the inner diameter of the stop ring 15. The outer shape of the fixed disk may be any shaped keyed to the stop ring, where a stop ring is used, or it may be formed integrally with the end cap or the valve body, so that it merely constitutes a disk portion of surrounding structure.

FIG. 4 shows an alternative configuration of the rotatable valve component 3 and its carrier 12, which may be used in the valve of FIGS. 1 and 2, or the following figures. This rotatable valve component resembles the rotatable disk, but is not a fully formed disc. Instead, the rotatable valve component comprises a rotatable structure sufficient to occlude the apertures of the fixed disk or fixed component. The rotatable valve component 20 illustrated in FIG. 4 includes generally triangular wings 21 configured occlude the corresponding apertures of the fixed valve component. The carrier 12 in this embodiment is shaped to conform to the rotatable valve component 20, such that the rotatable valve component must rotate with the carrier. Likewise, the fixed valve component can be formed as a fully formed disk as shown in the Figures, but may also be formed with generally triangular wings, and corresponding circumferentially space gaps, sized and dimensioned to be occluded by the wings of the rotatable valve component 20. The rotatable valve component of FIG. 4 may have an outer diameter closely matching the inner diameter of the valve body, or it may have an outer diameter smaller than the inner diameter of the valve body but large enough to occlude the apertures 6 of the fixed valve component (or, if used in the valve of FIGS. 7 and 8, the channels 11 passing the motor housing).

Comparison of the disks of FIG. 1 and the components of FIG. 4 demonstrates that, although the rotatable valve component and the fixed valve component may be formed as disks, with apertures to allow flow, and circumferential contours shaped to mate with surrounding structures, these components can be formed in a variety of cooperating shapes.

FIG. 5 is a cross section of the valve, through the region holding the fixed disk. The surface of the flutes 5 can be seen through the apertures of the fixed disk, and tabs 16, as described above, engage slots in the stop ring 15, to prevent the fixed disk from rotating within the bore.

FIG. 6 is a cross section of the valve, through the region holding the motor and the flow path around the motor. The channels 11 run longitudinally past the motor 8 and any intervening housing or material of the wall of the valve body. In this embodiment, the channels are formed by drilling through the length of a solid valve body, and the motor well is formed by machining a void in a solid valve body. The channels may be formed by other methods, such as extrusion of the valve body, and the channels may be merged into a single channel surrounding the motor well on three sides, or they may completely surround the motor housing. One method of making the valve comprises machining the valve body from a solid stock (such as a cylinder), by machining (boring or milling) the motor well into the side of the cylinder, drilling the channels 11 from the ends of the stock, drilling the bore 7 from the end of the stock, inserting the motor into the well, inserting the rotating valve component into the bore and fixing it to the motor shaft, and inserting the fixed valve component into the bore.

Figure 7:
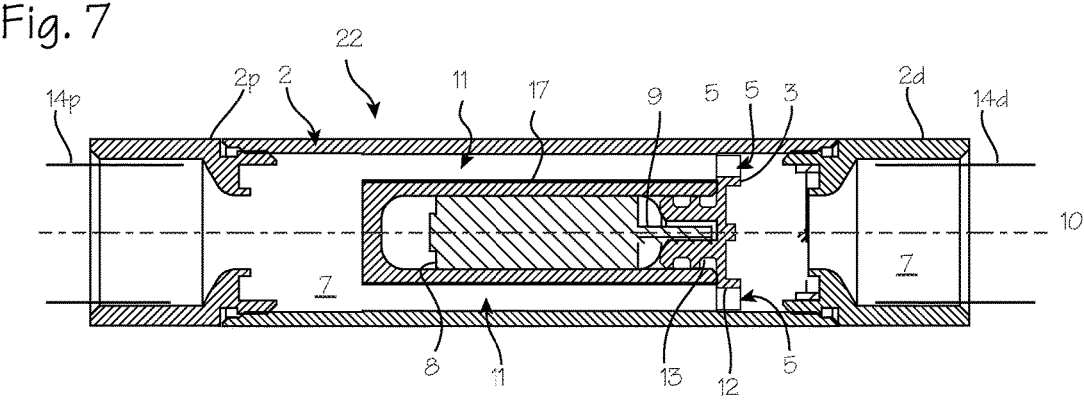
FIGS. 7 and 8 are a cross-sections of a valve similar to the valve of FIG. 1, in which the body of the valve functions as the fixed valve component.
Figure 8:
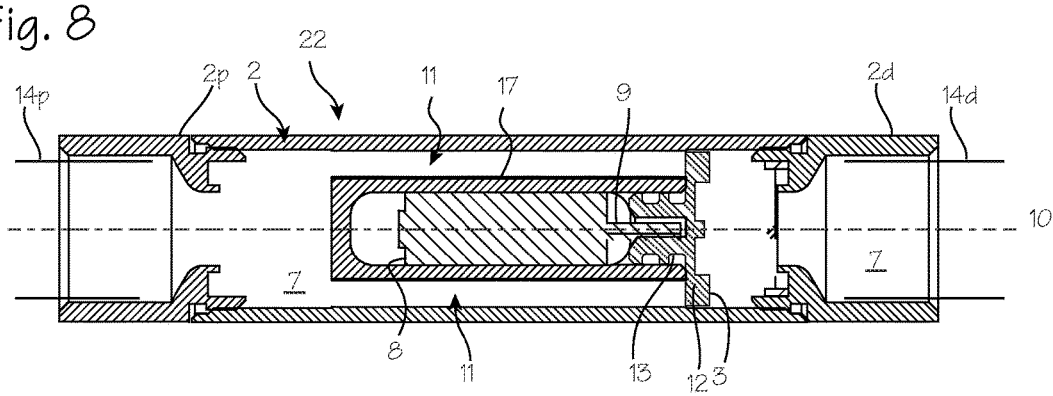
Figure 9:
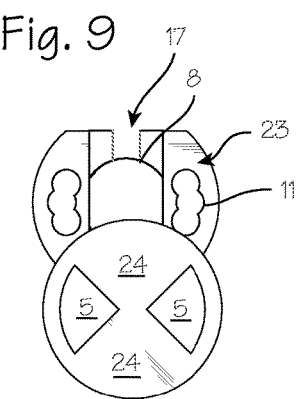
FIGS. 9 and 10, which illustrate the open and closed positions of the rotatable disk relative to the channels of FIGS. 8 and 7.
Figure 10:
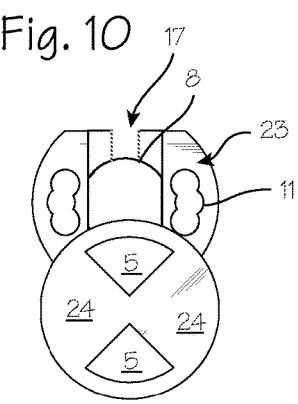

FIGS. 7 and 8 are a cross-sections of a valve similar to the valve of FIG. 1, in which the body of the valve functions as the fixed valve component. The components of the valve 22 are similar to the components of valve 1 of FIG. 1, including the valve body 2, the rotating disk 3, the bore 7, the motor 8 and motor shaft 9, and the flow channels 11 on either side of the motor housing 17. In this valve, the portion of the body of the valve which surrounds the motor well serves as the fixed valve component, and the rotating component 3 is fixed to the motor shaft 9 through the mounting post 13. A fixed disk may be included, but is not necessary in this construction. The openings 5 of the rotating disk are apertures that extend through the entire longitudinal thickness of the valve, and the rotating disk is tightly disposed against the opposing face 23 (shown in FIGS. 9 and 10) of the motor housing. As shown in FIG. 7, the apertures 5 are aligned with the channels 11, so that water may flow through the valve. As shown in FIG. 8, the apertures 5 are misaligned with the channels 11, and aligned with solid or void portions of the valve body, and the solid portions 24 of the rotatable disk are aligned with the channels, to block the channels, so that water may not flow through the valve. This shown also in FIGS. 9 and 10, which illustrate the open and closed positions of the rotatable disk 3 relative to the channels 11 passing around the motor housing. In FIG. 9, the rotatable disk is shown in a first configuration, rotated relative to the valve body such that the apertures 5 are aligned with the channels 11, while in FIG. 10, the rotatable disk is shown in a second configuration, rotated relative to the valve body such that the solid portions 24 of the disk are aligned with the channels 11. The rotatable disk may have an outer diameter closely matching the inner diameter of the valve body, as shown, or it may have an outer diameter smaller than the inner diameter of the valve body but large enough to occlude the channels 11 passing the motor housing.

FIG. 11 illustrates a version of valve 1, in which the rotatable disk is distanced from the motor housing, and the rotatable disk openings 5 are apertures which extend through the rotatable disk. In this embodiment, the motor shaft 9 or the mounting post 13 are elongated, so that the rotatable disk 3 is longitudinally displace from the face of the motor housing (item 23 in FIGS. 9 and 10). In this embodiment, the rotatable disk bears against the fixed disk 4, and rotates relative to the fixed disk to open and close the valve. When in the open configuration, water may flow through the rotatable disk, from one longitudinal face to the opposing longitudinal face, rather than flowing past the longitudinal face opposing the fixed disk and the circumference of the rotatable disk, as in FIGS. 1 and 2. The rotatable disk may have an outer diameter closely matching the inner diameter of the valve body, as shown, or it may have an outer diameter smaller than the inner diameter of the valve body but large enough to occlude the apertures 6 of the fixed valve component.

FIG. 12 shows an end-view of the valve of FIGS. 1 through 3, 7 and 8, or FIG. 11, to illustrate one manner in which the motor well is established and isolated from the flow of fluid past the motor. This view, looking into the bore 7 from the distal end of the valve (the right side in FIGS. 1 through 3, 7 and 8, or FIG. 11) shows the valve body 2, with the end cap 19, rotating disk 3 fixed disk 4 ring 12 mounting post 13 removed so that the distally facing face of the motor housing (the end wall of the motor housing) 23 is visible. The motor 8 is shown in phantom, behind the face of the motor housing. The interior side walls 25 of the motor housing are also shown in phantom. The motor shaft 9 extends from the motor through an aperture 26. The aperture is sealed by the mounting post 13, inserted into the aperture, as appears in FIGS. 1, 2 and 11. The end wall of the motor housing can also be established by the mounting post 13 in conjunction with the ring 12, as illustrated in FIGS. 7 and 8. The flow channels 11 provide a fluid pathway around the motor and through the valve, while the motor well provides a volume within the bore of the valve isolated from the water flow around the motor.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A valve comprising:
    a valve body having a substantially straight bore extending through the valve body and defining a longitudinal axis of the valve body;
    a rotatable valve component, rotatable relative to the valve body, rotatably disposed within the bore of the valve body, said rotatable valve component having a first aperture;
    a fixed valve component, fixed relative the valve body, and disposed within the bore proximate to the rotatable valve component, said fixed valve component having a second aperture;
    a motor disposed within the bore, connected to the rotatable valve component and operable to rotate the rotatable valve component within the valve body, said motor having a longitudinal axis, wherein said longitudinal axis of the motor is aligned parallel with the longitudinal axis of the valve body; and
    a motor well, disposed within the bore, wherein said motor well provides a volume within the bore of the valve isolated from the water flow around the motor, with the motor disposed within the motor well, wherein the motor well is open to the outside of the valve through a wall of the valve, such that the motor is insertable into the motor well through the wall of the valve.

2. The valve of claim 1, wherein:
    the rotatable valve component comprises a rotatable disk having an outer diameter smaller than the bore of the valve body proximate the rotatable disk, and the first aperture extends from a face of the rotatable disk opposing the fixed valve component to a side wall of the rotatable disk, to establish a flow path between the rotatable disk and the valve body.

3. The valve of claim 1, wherein:
    the rotatable valve component comprises a disk.

4. The valve of claim 1, wherein:
the fixed valve component comprises a disk.

5. The valve of claim 1, wherein:
the rotatable valve component comprises a disk having an axis of rotation; and
the fixed valve component comprises a disk having a central axis
wherein the axis of rotation of the rotatable valve component and the central axis of the fixed valve component are coaxial with the longitudinal axis of the valve body.

6. The valve of claim 5, wherein:
the motor is disposed within the bore such that the motor is coaxial with the rotatable valve component.

7. The valve of claim 1, wherein:
the motor is disposed within the bore such that the motor is coaxial with the rotatable valve component.

8. The valve of claim 1, wherein:
the apertures of the rotatable valve component comprise flutes, communicating from a face of the rotatable valve component abutting the fixed valve component to a sidewall of the rotatable valve component.

9. A valve comprising:
a valve body having a substantially straight bore extending through the valve body and defining a longitudinal axis of the valve body;
a rotatable disk, rotatable relative to the valve body, rotatably disposed within the bore of the valve body, said rotatable disk having a first aperture;
a fixed disk, fixed relative the valve body, and disposed within the bore proximate to the rotatable disk, said fixed disk having a second aperture;
a motor disposed within the bore, connected to the rotatable disk and operable to rotate the rotatable disk within the valve body, said motor having a longitudinal axis, wherein said longitudinal axis of the motor is parallel with the longitudinal axis of the valve body; and
a motor well, disposed within the bore, wherein said motor well provides a volume within the bore of the valve isolated from the water flow around the motor, with the motor disposed within the motor well; wherein
the motor well is open to the outside of the valve through a wall of the valve, such that the motor is insertable into the motor well through the wall of the valve.

10. The valve of claim 9, wherein:
the rotatable disk has an outer diameter smaller than the bore of the valve body proximate the rotatable disk, and the first aperture extends from a face of the rotatable disk opposing the fixed disk to a side wall of the rotatable disk, to establish a flow path between the rotatable disk and the valve body.

* * * * *